(12) United States Patent
Bibighaus et al.

(10) Patent No.: US 10,183,765 B2
(45) Date of Patent: Jan. 22, 2019

(54) THRUSTER ARRANGEMENT FOR GEOSYNCHRONOUS ORBIT SPACECRAFT

(71) Applicant: Lockheed Martin Corporation, Bethesda, MD (US)

(72) Inventors: Brian P. Bibighaus, Santa Cruz, CA (US); Dominic Anthony Sciulli, Aston, PA (US); Neil E. Goodzeit, Princeton, NJ (US); Johnny Milien, Langhorne, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 25 days.

(21) Appl. No.: 14/207,389

(22) Filed: Mar. 12, 2014

(65) Prior Publication Data

US 2017/0349302 A1   Dec. 7, 2017

(51) Int. Cl.
*B64G 1/26* (2006.01)
*B64G 1/40* (2006.01)
*B64G 1/22* (2006.01)

(52) U.S. Cl.
CPC .............. *B64G 1/26* (2013.01); *B64G 1/405* (2013.01); *B64G 1/222* (2013.01)

(58) Field of Classification Search
CPC . B64G 1/26; B64G 1/40; B64G 1/405; B64G 1/503; B64G 1/506; B64G 1/50;
(Continued)

(56) References Cited

U.S. PATENT DOCUMENTS

RE23,936 E * 2/1955 Winslow .......................... 244/79
3,386,380 A * 6/1968 Francis .......................... 102/405
(Continued)

FOREIGN PATENT DOCUMENTS

EP  2810875 A2  12/2014
EP  2810876 A2  12/2014

OTHER PUBLICATIONS

Corey, et al., "Performance and Evolution of Stationary Plasma Thruster Electric Propulsion for Large Communications Satellites," 28th AIAA International Communications Satellite Systems Conference, Aug. 2010, pp. 1-20, AIAA 2010-8688, Anaheim, CA.
(Continued)

*Primary Examiner* — Medhat Badawi
(74) *Attorney, Agent, or Firm* — Morton, Lewis & Bockius LLP

(57) ABSTRACT

According to some aspects of the subject disclosure, a spacecraft comprises first and second pluralities of thrusters. The pluralities of thrusters are attached to a spacecraft body by booms configured to move the first plurality of thrusters between stowed and deployed positions. The deployed position of the first plurality of thrusters is farther north than is the stowed position of the first plurality of thrusters. The deployed position of the second plurality of thrusters is farther south than is the stowed position of the second plurality of thrusters. The first plurality of thrusters comprises a first thruster and a second thruster separated from each other in an east-west direction. The second plurality of thrusters comprises a third thruster and a fourth thruster separated from each other in the east-west direction.

23 Claims, 9 Drawing Sheets

(58) Field of Classification Search
CPC ........ B64G 1/402; B64G 1/645; B64G 1/222; B64G 1/58
USPC .................................. 244/171.2, 171.1, 169
See application file for complete search history.

(56) References Cited

U.S. PATENT DOCUMENTS

| | | | |
|---|---|---|---|
| 5,020,746 A | 6/1991 | Anzel | |
| 5,443,231 A | 8/1995 | Anzel | |
| 5,813,633 A | 9/1998 | Anzel | |
| 5,984,236 A | 11/1999 | Keitel et al. | |
| 6,032,904 A * | 3/2000 | Hosick et al. | 244/169 |
| 6,135,394 A | 10/2000 | Kamel et al. | |
| 6,186,446 B1 * | 2/2001 | Tilley | B64G 1/007 244/164 |
| 6,296,207 B1 | 10/2001 | Tilley et al. | |
| 6,435,457 B1 | 8/2002 | Anzel | |
| 6,565,043 B1 * | 5/2003 | Wittmann | 244/169 |
| 6,637,701 B1 * | 10/2003 | Glogowski et al. | 244/169 |
| 6,945,500 B2 * | 9/2005 | Wingo | 244/159.4 |
| 7,059,571 B2 * | 6/2006 | Kellberg | 244/169 |
| 7,118,075 B2 * | 10/2006 | Schubert | 244/169 |
| 9,114,890 B1 * | 8/2015 | Campbell | B64G 1/242 |
| 2004/0031885 A1 * | 2/2004 | D'Ausilio | B64G 1/1078 244/172.5 |
| 2004/0164205 A1 * | 8/2004 | Kellberg | B64G 1/405 244/171.1 |
| 2004/0245407 A1 * | 12/2004 | D'Ausilio | B64G 1/007 244/158.5 |
| 2005/0077425 A1 * | 4/2005 | Payette | B64G 1/409 244/62 |
| 2005/0151022 A1 * | 7/2005 | D'Ausilio | B64G 1/007 244/171.1 |
| 2007/0040067 A1 * | 2/2007 | D'Ausilio | B64G 1/007 244/172.5 |
| 2007/0221787 A1 * | 9/2007 | McKinnon | B64G 1/503 244/171.8 |
| 2008/0296436 A1 * | 12/2008 | D'Ausilio | B64G 1/007 244/171.1 |
| 2009/0166476 A1 | 7/2009 | Termini | |
| 2013/0292516 A1 | 11/2013 | Celerier | |
| 2013/0313369 A1 * | 11/2013 | Celerier | 244/158.6 |
| 2016/0114909 A1 * | 4/2016 | Walker | B64G 1/222 244/158.5 |
| 2016/0159500 A1 * | 6/2016 | Marks | B64G 1/443 244/172.6 |
| 2016/0176545 A1 * | 6/2016 | Munir | B64G 1/242 244/158.6 |

OTHER PUBLICATIONS

Extended European Search Report from 15761262.3, dated Sep. 28, 2017, 11 pages.

* cited by examiner

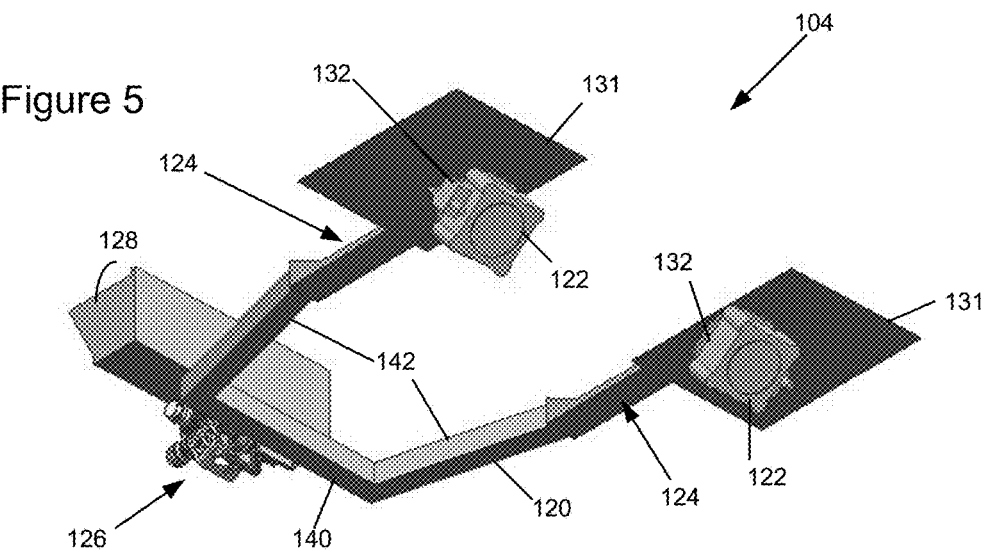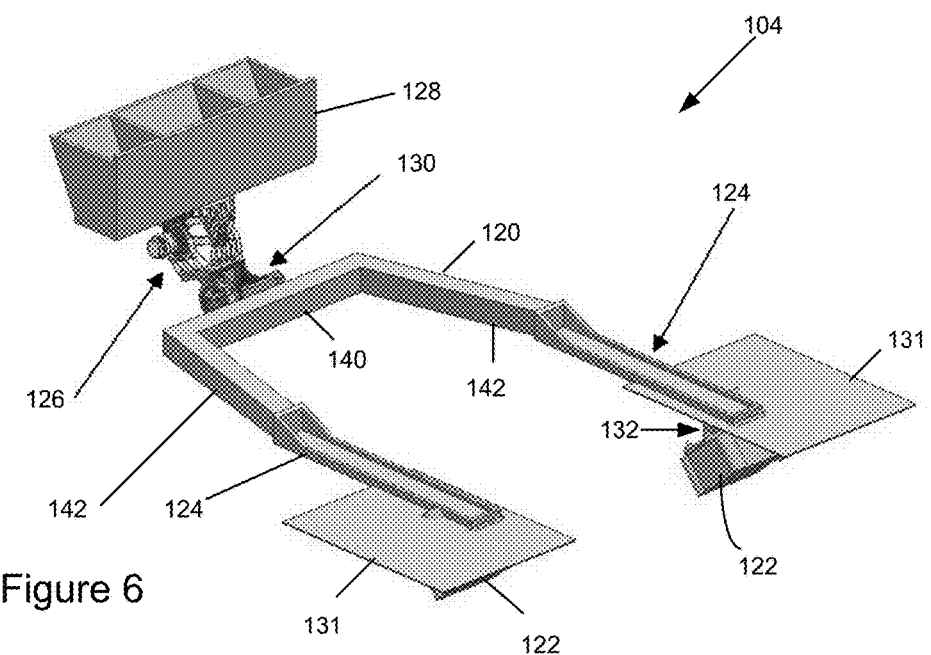

Figure 7
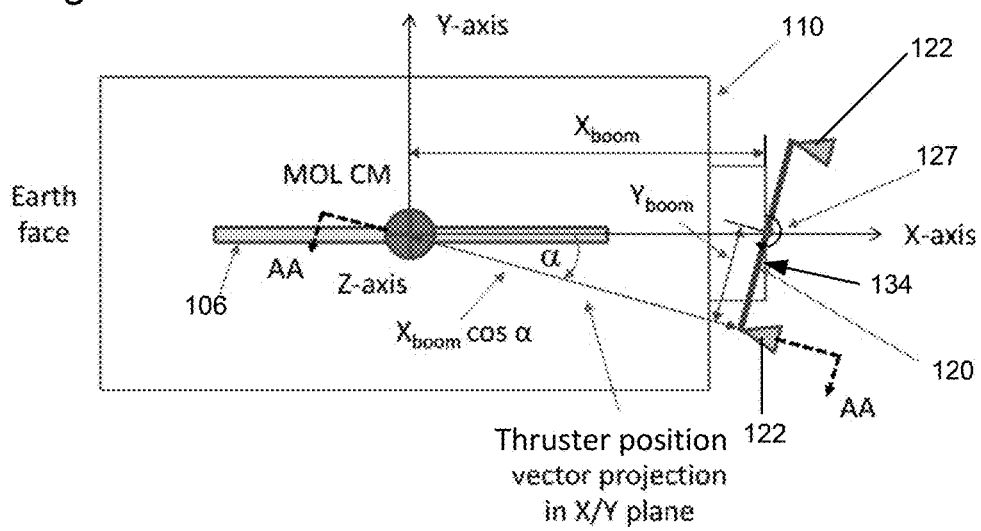
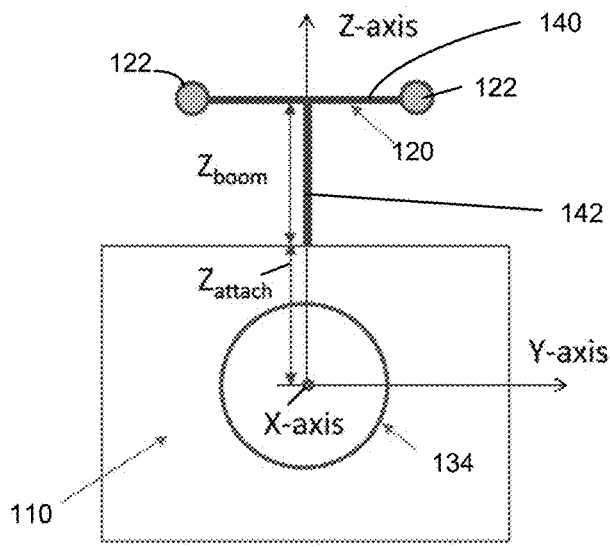
Figure 8

THRUSTER ARRANGEMENT FOR GEOSYNCHRONOUS ORBIT SPACECRAFT

STATEMENT REGARDING FEDERALLY SPONSORED RESEARCH OR DEVELOPMENT

Not applicable.

FIELD OF THE INVENTION

The present invention relates generally to spacecraft, and more particularly to thruster arrangements for geosynchronous orbit spacecraft.

BACKGROUND

Xenon-Ion propulsion systems have become widely used on Geosynchronous Orbit (GEO) communications spacecraft. These systems have much higher efficiency than chemical systems and can be an effective means to increase the payload mass delivered to orbit or enable launch on lower cost and less capable launch vehicles.

SUMMARY OF THE INVENTION

There are significant implementation considerations that affect how Xenon-Ion thrusters are physically arranged and operated. The thrusters should be positioned to minimize plume erosion of surfaces and prevent communications signal distortion. The thrusters are preferably arranged to efficiently support both orbit transfer and mission-orbit stationkeeping. The thrusters should be configured to prevent thermal impacts to spacecraft components or interactions with each other. The thruster arrangement must be compatible with constraints imposed by the launch vehicle fairing. In some aspects of the subject technology, arrangements of thrusters (e.g., Xenon-Ion thrusters) for GEO spacecraft address some or all these issues and provide significant mission benefits compared to existing arrangements.

In some aspects of the subject technology, an arrangement of thrusters (e.g., Xenon-Ion thrusters) for GEO spacecraft positions the thrusters to minimize plume erosion of surfaces, prevent communications signal distortion, efficiently support both orbit transfer and mission-orbit stationkeeping, prevent thermal impacts to spacecraft components, prevent interactions between thrusters, and are compatible with constraints imposed by the launch vehicle fairing.

According to some aspects of the subject disclosure, a spacecraft comprises first and second pluralities of thrusters. The pluralities of thrusters are attached to a spacecraft body by booms configured to move the first plurality of thrusters between stowed and deployed positions. The deployed position of the first plurality of thrusters is farther north than is the stowed position of the first plurality of thrusters. The deployed position of the second plurality of thrusters is farther south than is the stowed position of the second plurality of thrusters. The first plurality of thrusters comprises a first thruster and a second thruster separated from each other in an east-west direction. The second plurality of thrusters comprises a third thruster and a fourth thruster separated from each other in the east-west direction.

In some aspects of the subject technology, a spacecraft comprises a spacecraft body, a first plurality of thrusters, and a second plurality of thrusters. The spacecraft body comprises a forward end, an aft end, a north side, a south side, an east side, and a west side. The spacecraft body has an x-axis, a y-axis, and a z-axis. The x-axis extends in a forward-aft direction. The y-axis extends in an east-west direction. The z-axis extends in a north-south direction. The x-axis, the y-axis, and the z-axis being orthogonal to each other. The first plurality of thrusters is positioned on a north side of the spacecraft body, and comprises a first thruster and a second thruster. The first thruster and the second thruster are separated from each other along the y-axis. The second plurality of thrusters positioned on a south side of the spacecraft body, and comprises a third thruster and a fourth thruster. The third thruster and the fourth thruster are separated from each other along the y-axis. Each plurality of thrusters is attached to the spacecraft body (a) by at least one boom that pivots between a first stowed position and at least one first thruster-firing position, and (b) such that each plurality of thrusters is rotatable about at least two nonparallel axes.

In some aspects of the subject technology, a spacecraft comprises a spacecraft body, a first plurality of thrusters, and a second plurality of thrusters. The first plurality of thrusters is attached to the spacecraft body by at least one boom configured to move the first plurality of thrusters from a stowed position to at least one firing position. The firing position of the first plurality of thrusters is farther north of a center of mass of the spacecraft body than is the stowed position of the first plurality of thrusters. The first plurality of thrusters comprises a first thruster and a second thruster that are separated from each other in an east-west direction. The first thruster and the second thruster are pivotable about at least two nonparallel axes. The second plurality of thrusters is attached to the spacecraft body by at least one boom configured to move the second plurality of thrusters from a stowed position to at least one firing position. The firing position of the second plurality of thrusters is farther south of the center of mass of the spacecraft body than is the stowed position of the second plurality of thrusters. The second plurality of thrusters comprises a third thruster and a fourth thruster that are separated from each other in the east-west direction. The third thruster and forth thruster are pivotable about at least two nonparallel axes.

In some aspects of the subject technology, a method of operating a spacecraft comprises moving and firing a first plurality of thrusters and a second plurality of thrusters. The first plurality of thrusters, attached to a spacecraft body, is moved from a stowed position to a firing position. The firing position of the first plurality of thrusters is farther north of a center of mass of the spacecraft body than is the stowed position of the first plurality of thrusters. The first plurality of thrusters comprises a first thruster and a second thruster that are separated from each other in an east-west direction. The second plurality of thrusters, attached the spacecraft body, are moved from a stowed position to at least one firing position. The firing position of the second plurality of thrusters is farther south of the center of mass of the spacecraft body than is the stowed position of the second plurality of thrusters. The second plurality of thrusters comprises a third thruster and a fourth thruster that are separated from each other in the east-west direction. With the first plurality of thrusters and the second plurality of thrusters in their respective firing positions, at least some of the thrusters can be fired to generate in-track thrust. With the first plurality of thrusters and the second plurality of thrusters in their respective firing positions, at least some of the thrusters can be fired to generate cross-track thrust.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology.

BRIEF DESCRIPTION OF THE DRAWINGS

The accompanying drawings, which are included to provide further understanding of the subject technology and are incorporated in and constitute a part of this description, illustrate aspects of the subject technology and, together with the specification, serve to explain principles of the subject technology.

FIGS. 5 and 6 are perspective views of a boom and a plurality of thrusters, wherein the boom comprises a boom extension for adjustment of a length of the boom.

FIG. 7 schematically illustrates thruster geometry, in an x/y plane, for stationkeeping operations.

FIG. 8 schematically illustrates thruster geometry, in a y/z plane, for stationkeeping operations.

DETAILED DESCRIPTION OF THE INVENTION

Figure 1:
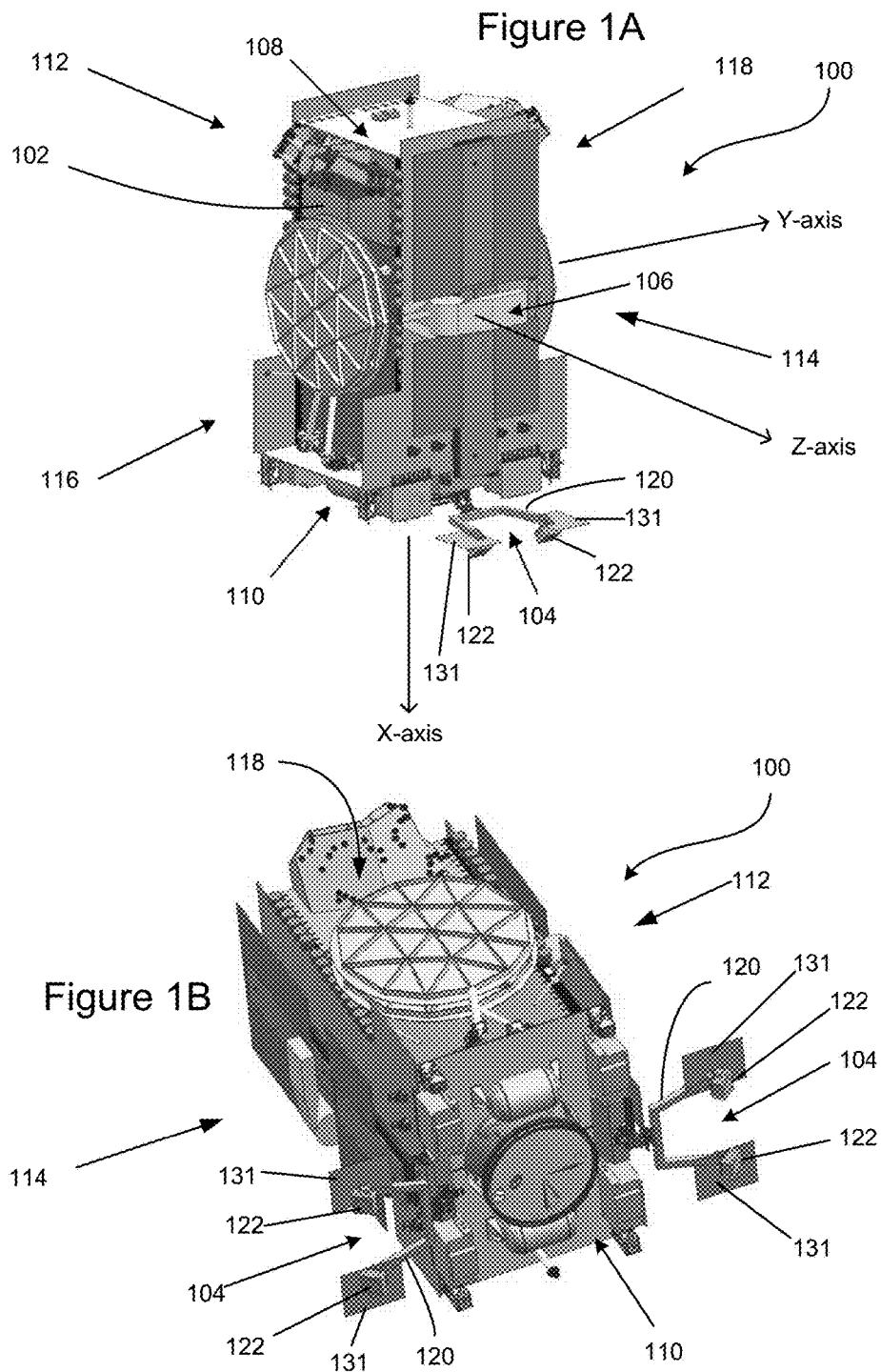
FIG. 1A is a perspective view of a spacecraft comprising a plurality of thrusters attached to a boom, and illustrates the boom and the plurality of thrusters in a deployed position.
FIG. 1B is a perspective view of the spacecraft of FIG. 1A, and illustrates a boom with a plurality of thrusters on each of two opposing sides of the spacecraft.

The detailed description set forth below is intended as a description of various configurations of the subject technology and is not intended to represent the only configurations in which the subject technology may be practiced. The detailed description includes specific details for the purpose of providing a thorough understanding of the subject technology. However, the subject technology may be practiced without some of these specific details. In some instances, well-known structures and components are not shown, or are shown schematically or in block diagram form, to avoid obscuring the concepts of the subject technology.

Reference is made in detail to aspects of the subject technology, examples of which are illustrated in the accompanying drawings, wherein like reference numerals refer to like elements throughout.

Figure 2:
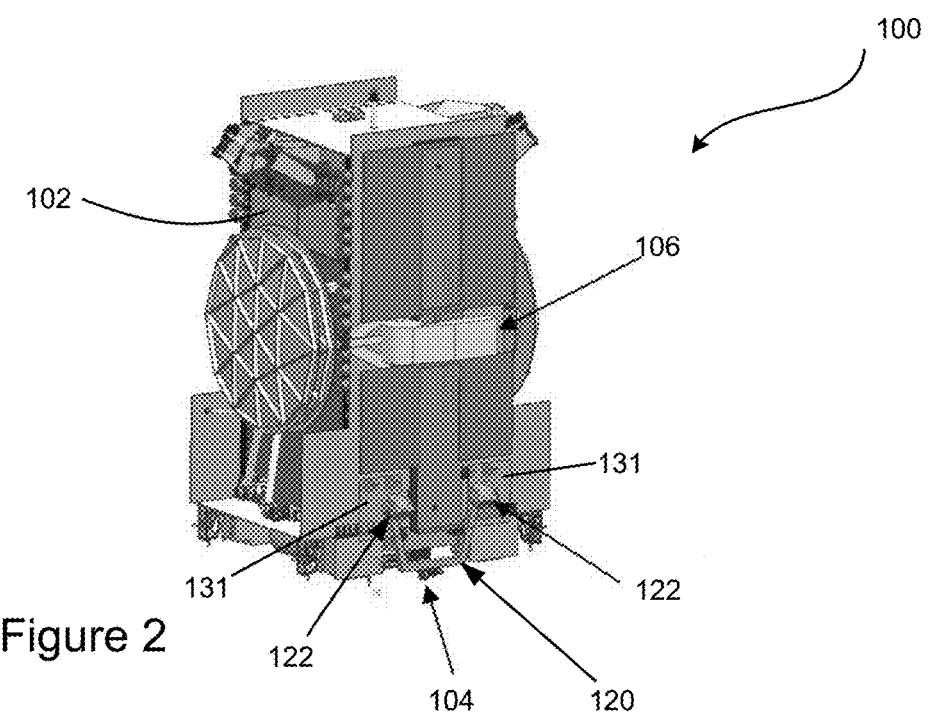
FIG. 2 is a perspective view of the spacecraft of FIGS. 1A and 1B, and illustrates the boom and the plurality of thrusters in a stowed position.

FIGS. 1A-4 show a spacecraft 100 illustrating various aspects of the subject technology. FIGS. 1A, 1B, and 2 show the spacecraft 100 comprising a spacecraft body 102 and first and second thruster mounting assemblies 104. The second thruster mounting assembly can be the same as, substantially the same as, or different from the illustrated thruster mounting assembly 104. The spacecraft 100 can also include other components, such as, for example, solar arrays 106.

In FIGS. 1A-2, the spacecraft body 102 is shown comprising an Earth deck 108 and a base panel 110.

As illustrated in FIG. 1A, the spacecraft body has a south side 112, north side 114, a west side 116, and an east side 118. The spacecraft 100 has an x-axis, a y-axis, and a z-axis. The x-axis extends in a forward-aft direction. The y-axis extends in an east-west direction. The z-axis extends in a north-south direction. The x-axis, the y-axis, and the z-axis are orthogonal to each other.

The thruster mounting assemblies 104 shown in FIGS. 1A-4 each comprise a boom 120 and two thrusters 122. Although the first and second thruster mounting assemblies 104 are shown comprising two thrusters, thruster mounting assemblies can comprise other numbers of thrusters in some aspects of the subject technology. As noted above, the spacecraft 100 of FIGS. 1A-4 comprises two thruster mounting assemblies. As illustrated in FIG. 1B, one is mounted at or near the north side 114 of the base panel 110, and the other is mounted at or near the south side 112.

In some aspects of the subject technology, the thrusters comprise ion thrusters. In some aspects, the ion thrusters are xenon-ion thrusters or Gridded Ion Engines. In some aspects, the ion thrusters are Hall Current Thrusters (HCTs) or Stationary Plasma Thrusters (SPTs).

Figure 3:
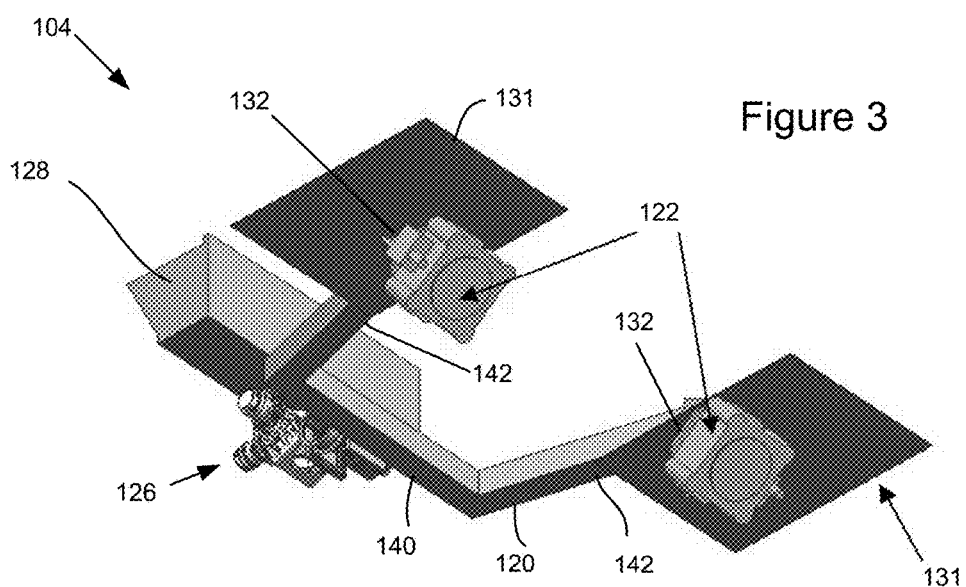
FIGS. 3 and 4 are enlarged perspective views of the boom and the plurality of thrusters of FIGS. 1A, 1B, and 2, and show the boom and the plurality of thrusters.
Figure 4:
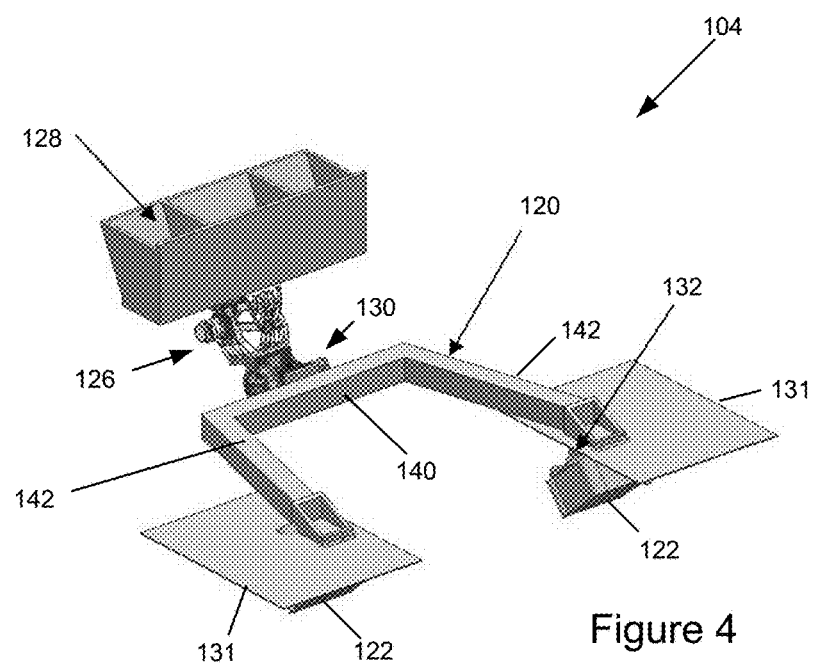

As shown in FIGS. 3 and 4, the boom 120 comprises a wish-bone like structure that provides lateral (y-axis) separation between the thrusters, e.g., HCTs. In some aspects of the subject technology, the boom 120 can comprise a generally T-, U-, V-, or Y-shaped structure that provides lateral (y-axis) separation between the thrusters. With this lateral separation, and with its thrust vector directed through the spacecraft center-of-mass (CM), each thruster can generate both in-track and cross-track thrust as required to support East/West (E/W) and North/South (N/S) stationkeeping. In contrast, existing boom-deployed HCT systems, which do not provide lateral separation, can support only N/S stationkeeping.

Figure 9:
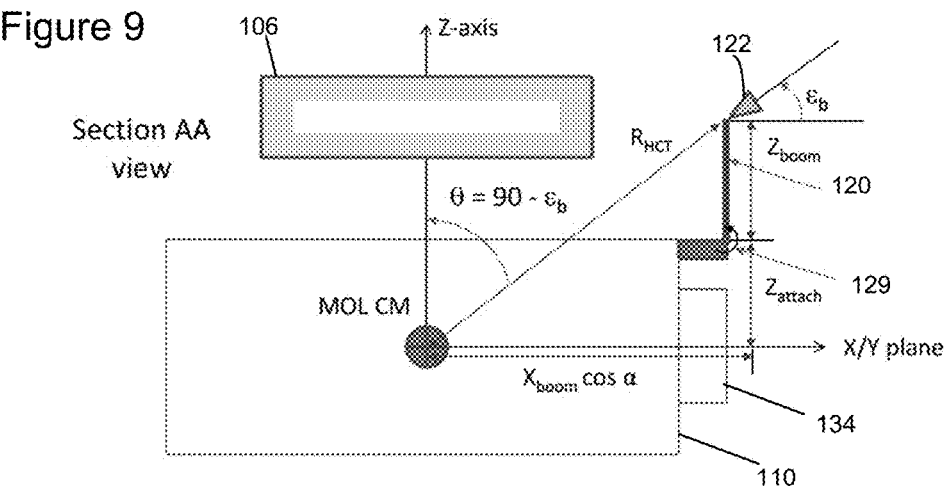
FIG. 9 schematically illustrates thruster geometry, in an x/z plane, for stationkeeping operations.
Figure 10:
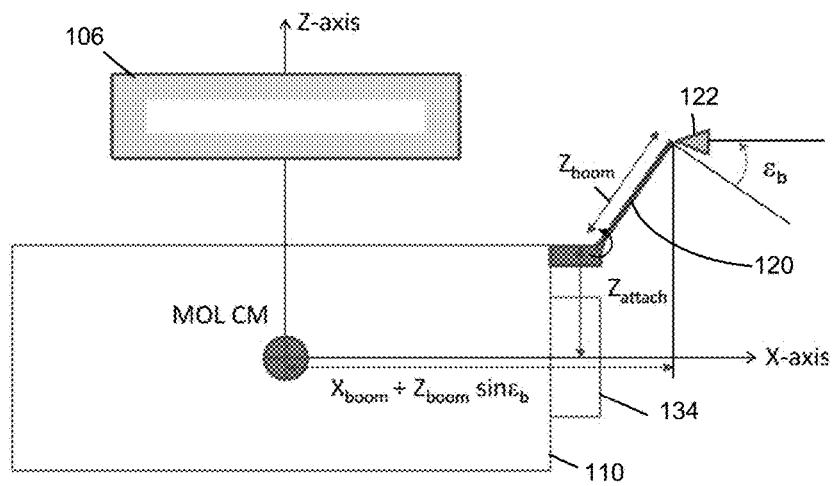
FIG. 10 schematically illustrates thruster geometry, in an x/z plane, for orbit transfer operations.

The boom 120 is illustrated in FIGS. 1A, 1B, and 3-6 in a deployed position in which the boom extends substantially parallel to the Y/Z plane. In some aspects of subject technology, the boom can extend parallel or nonparallel to the Y/Z plane in one or more deployed positions. In some embodiments, the boom can be non-parallel to the Y/Z plane for orbit transfer, for example as illustrated in FIG. 10. In some aspects wherein a boom cannot be positioned parallel or substantially parallel to the Y/Z plane, the boom geometry can be defined by hypothetical rotation and/or a projection of the boom into the Y/Z plane. With the boom considered as positioned parallel to the Y/Z plane, the booms illustrated in FIGS. 1A, 1B, 3, and 4 each comprise a lateral member 140 and two arms 142. The lateral member 140 has a length extending parallel to the y-axis between attachments to the arms 142. The arms 142 extend in both the y- and z-directions from the lateral member 140 to the thrusters 122. In some aspects, the arms 142 extend parallel to the z-axis. In some aspects, the lateral member 140 are omitted and the arms 142 are joined together at, or unitarily formed with, their ends closer to the spacecraft body 102 in a V-shape, and can be pivotally attached to the spacecraft body, optionally with another member extending along the z-axis between the pivotal attachment and the V-shaped member or assembly such that the boom generally has a Y-shape. In some aspects, the boom 120 comprises a unitary member bent into a U-shape or multiple members assembled into a U-shape, and pivotally attached to the spacecraft body, optionally with another member extending along the z-axis between the pivotal attachment and the U-shaped member or assembly. In some aspects, the boom 120 comprises an arm extending along the z-axis from a pivotal attachment to the spacecraft body 102 to a lateral member 140, to which the thrusters 122 are mounted (see FIGS. 7-9). Arms or other members can be interposed between the arms 142 and/or lateral members 140 (if present) of these and other arrangements. For example, in some aspects, the boom 120 comprises a lateral member 140, a first plurality of arms 142 extending from the lateral member 140 in both the y- and z-directions, and a second plurality of arms 142 extending from the first plurality of arms to the thrusters 122 (see FIG. 13). Each arm in the second plurality of arms can extend parallel to the z-axis or in both the y- and z-directions.

The boom 120 can be configured in any of a variety of arrangements to position the thrusters 122 in a desired location relative to the spacecraft body 102 in the z-direction. In some aspects, the boom has a length in the z-direction (Zboom) from a pivotal attachment with the spacecraft body 102 to an attachment with the thrusters 122 (see FIGS. 7-10).

The boom 120 can be configured in any of a variety of arrangements to position the thrusters 122 at a desired location relative to the spacecraft body 102 in the y-direction, and relative to each other in the y-direction. Yboom is the distance between the thruster 122 and a boom azimuth axis as measured in the y-direction (see FIG. 7).

FIGS. 5 and 6 illustrate a thruster mounting assembly 104 wherein the boom 120 comprises a boom extension 124 to adjust the length of the boom. By adjusting the boom length, large z-axis deployed thruster positions and small Theta angles, discussed below, are possible with the thrusters positioned aft of the base panel 110 to reduce, and preferably minimize, plume effects.

Each of the booms 120 of the spacecraft 100 illustrated in FIGS. 1A-4 is mounted to the spacecraft body 102 by a two-axis gimbal 126 and a support structure 128 connected to the base panel 110. The thruster mounting assemblies 104 of the spacecraft 100 illustrated in FIGS. 1A-4 also comprise a hinge 130 that allows the assembly 104 to be rotated between a stowed position and one or more deployed positions. In the stowed position, the thruster mounting assembly 104 is preferably positioned to avoid interference with a launch vehicle fairing, such as, for example, by moving the thruster mounting assembly 104 closer to the spacecraft body 102. The stowed position shown in FIG. 2, for example, is parallel to an equipment panel. In various aspects of the subject technology, the stowed position can be parallel or nonparallel to an equipment panel or other panel of the spacecraft body 102. In the deployed positions, the thrusters are positioned farther from the spacecraft body 102 than they are when in the stowed position. FIGS. 1A and 9-12 illustrate various deployed positions according to some aspects of the subject technology.

The gimbals 126 are used to control the thruster pointing for orbit transfer and stationkeeping. In the deployed position, the inner gimbal (spacecraft side) rotates the boom 120 about an axis parallel to the spacecraft pitch (Z) axis, and the outer gimbal (thruster side of the boom) rotates the boom about a perpendicular axis parallel to the spacecraft roll/yaw (X/Y) plane. Referring to FIGS. 5-7, this in-board rotation is referred to as boom azimuth 127 and the out-board rotation is referred to as boom elevation 129. When the boom 120 is in its zero azimuth and elevation position, its coordinate frame is aligned with the spacecraft body axes.

FIGS. 1A-6 show radiator panels 131 attached to and positioned between the boom 120 and each of the thrusters 122.

FIGS. 3-6 show each thruster mounted to the boom 120 via an elevation bracket 132 that provides a bias elevation pointing relative to the nominal boom coordinates. The boom is configured to provide a given deployed length and lateral separation of the thrusters. In some aspects of the subject technology, these three parameters are selected to provide Theta and Alpha angles that maximize fuel efficiency. The thruster geometry for stationkeeping operations is shown in FIGS. 7-9, which illustrate only the north thruster mounting assembly 104 for simplicity and clarity of illustration. The thruster geometry for the south thruster mounting assembly would be similar, but mirrored across the X/Y plane.

Generally, the elevation bias is selected so that, with the boom in its nominal position, an azimuth rotation equal to Alpha is sufficient to point the thrust vector through the middle-of-life (MOL) center of mass (CM) of spacecraft 100.

Referring to FIG. 9, the elevation bias may be calculated as:

$$\varepsilon_b = \tan^{-1}\left(\frac{Z_{boom} + Z_{attach}}{X_{boom}\cos\alpha}\right) \quad (1)$$

where Zattach is the distance from the spacecraft CM to the gimbal attachment along the spacecraft z-axis, and Zboom is the distance, along the spacecraft z-axis, from the gimbal attachment to the thruster attachment to the boom.

With the boom positioned for stationkeeping, the nominal Theta angle is then:

$$\theta(\text{deg}) = 90° - \varepsilon_b \quad (2)$$

Also, as can be seen from FIG. 7, Alpha is determined based on the thruster lateral offset (Yboom) from the boom gimbal axis:

$$\alpha = \sin^{-1}\left(\frac{Y_{boom}}{X_{boom}}\right) \quad (3)$$

where Xboom is the distance from the spacecraft CM to the gimbal attachment along the spacecraft X axis. Generally Xboom is determined to position the thrusters sufficiency aft to provide acceptable plume effects. For example, it is desirable to locate the boom x-axis attachment point as close to the spacecraft separation plane 134 as possible. With this location established, the thruster lateral separation can be determined to provide a desired Alpha according to Eq. (3), and the boom length (Zboom) determined from Eqs. (1) and (2) to provide a desired Theta.

Table 1 below provides boom parameters and Theta and Alpha angles for exemplifying thruster mounting arrangements according to various aspects of the subject technology. Values are provided for two representative x-axis locations of the spacecraft CM: 80 and 120 inches forward of the separation plane 134. For both CM locations, Theta angles of 51 deg or less are achieved with a common boom mounting location.

TABLE 1

Representative Boom and Thruster Parameters

| Parameter | S/C CM 120 inches* | S/C CM 80 inches* | Description |
|---|---|---|---|
| Xboom (in) | 127.3 | 87.3 | Boom attachment point along the x-axis (with respect to CM) |
| Yboom (in) | 22.3 | 22.3 | Thruster y-axis offset from boom azimuth axis |
| Zboom (in) | 63.0 | 37.4 | Boom z-axis length (from boom attachment with the body to the boom attachment to the thruster) |
| Stationkeeping parameters | | | |
| Thruster position (in) | X: 123.7 Y: 22.0 Z: 103.8 | X: 81.5 Y: 21.6 Z: 78.0 | Thruster position vector with respect to the spacecraft CM (X, Y, Z) |
| Thruster x-axis position with respect to separation plane (in) | 3.7 | 1.5 | Positive values are aft of the separation plane |
| Theta (deg) | 50.4 | 47.2 | Angle between the spacecraft z-axis and the thruster's thruster axis |
| Alpha (deg) | 10.1 | 14.8 | Angle of the thruster's thrust axis in the spacecraft X/Y plane |
| Orbit transfer parameters | | | |
| Thruster position (in) | X: 165.9 Y: 22.3 Z: 79.9 | X: 109.6 Y: 22.3 Z: 60 | Thruster position vector with respect to spacecraft CM (X, Y, Z) |
| Thruster x-axis position with respect to the separation plane (in) | 45.9 | 29.6 | Positive values are aft of the separation plane |

*CM position forward of the separation plane (toward the earth face)

Table 1 also provides thruster body-frame coordinates with the thrusters 122 positioned for stationkeeping and orbit transfer. As shown in FIG. 10, for orbit transfer the booms 120 are rotated so that the thrust vector is parallel to the body x-axis, which also positions the thrusters aft of the separation plane 134. This is achieved with zero azimuth angle and an elevation angle equal to minus the elevation bias.

In some aspects, Theta angles of 50 degrees or less, 45 degrees or less, or 40 degrees or less are achieved with a common boom mounting location.

Figure 15:
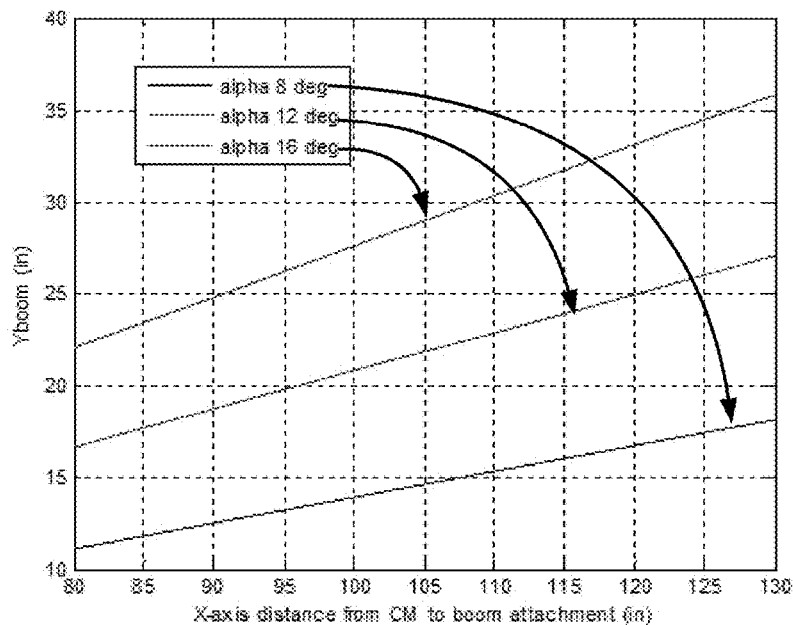
FIG. 15 shows representative Yboom values as a function of Xboom for several Alpha values.

FIG. 15 shows representative Yboom values as a function of Xboom for several Alpha values. As can be seen from FIG. 15, for a given Xboom, to achieve a larger Alpha requires an increase in the lateral separation between the thrusters. For a minimum center-of-mass-to-boom-attachment distance (Xboom) of 80 inches, the minimum Yboom ranges from about 11 to 22 inches depending on the Alpha angle. In this case the smallest Yboom corresponds to an Alpha of 8 deg, which is considered a practical minimum for GEO spacecraft E/W stationkeeping. The lateral (Y-axis) separation distance between the thrusters is then twice this value. In some aspects, Yboom is at least 10 inches, at least 11 inches, at least 16 inches, or at least 22 inches. In some aspects, Yboom is 11 to 36 inches. In some aspects, Yboom is 11 to 18 inches, 16 to 27 inches, or 22 to 36 inches. In some aspects, Yboom is adjustable between 11 and 18 inches, between 16 and 27 inches, or between 22 and 36 inches. In some aspects, the distance in the y-direction between two thrusters, on the same side of the spacecraft 100, is twice the distance of Yboom. In some aspects, the distance in the y-direction between two thrusters, on the same side of the spacecraft 100, is at least 20 inches, at least 22 inches, at least 32 inches, or at least 44 inches. In some aspects, the distance in the y-direction between two thrusters, on the same side of the spacecraft 100, is 22 to 72 inches. In some aspects, the distance in the y-direction between two thrusters, on the same side of the spacecraft 100, is 22 to 36 inches, 32 to 54 inches, or 44 to 72 inches. In some aspects, the distance in the y-direction between two thrusters, on the same side of the spacecraft 100, is adjustable between 22 and 36 inches, between 32 and 54 inches, or between 44 and 72 inches. Furthermore, there is a class of GEO missions where a passive inclination control strategy may be used, which reduces N/S Delta-V requirements. In this case, the E/W Delta-V requirements dominate and larger Alpha values may be used to increase overall fuel efficiency. For example, for an Alpha angle of 32 degrees, Yboom would vary from 42 to 69 inches for Xboom values from 80 to 130 inches. The separation between thrusters in this case would vary from 84 to 138 inches.

Figure 16:
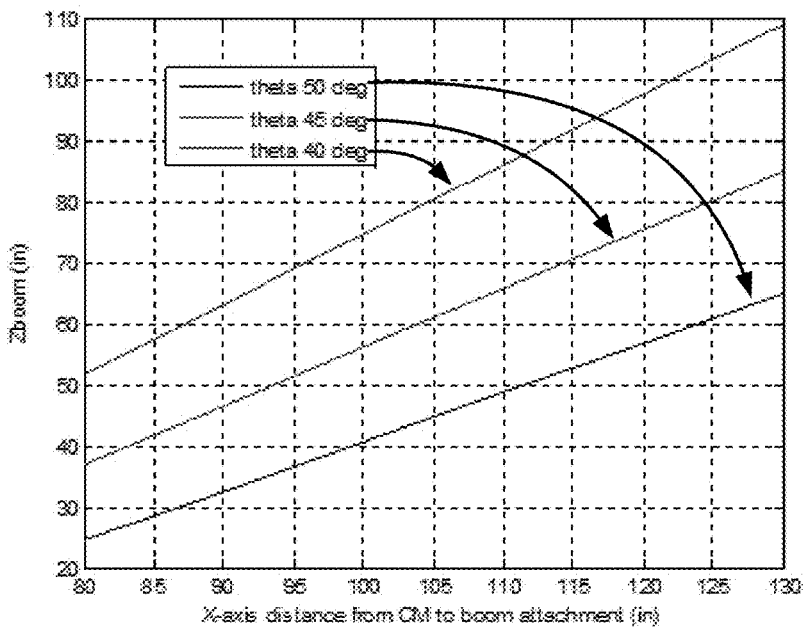
FIG. 16 shows representative Zboom values as a function of Xboom for several Theta values, and for an Alpha angle of 16 degrees.

FIG. 16 shows representative Zboom values as a function of Xboom for several Theta values, and for an Alpha angle of 16 degrees. This Alpha is generally considered the maximum practical value for fuel efficient GEO spacecraft stationkeeping. The exception is the passive inclination control case noted above, where larger Alpha values may be preferred. Other smaller and larger Alpha angles can be used in some aspects, where the value of Alpha may be determined to maximize fuel efficiency based on the N/S and E/W Delta-V requirements. As can be seen from FIG. 16, as Xboom increases, Zboom also increases. For a minimum center-of-mass-to-boom-attachment distance (Xboom) of 80 inches, the minimum Zboom ranges from about 25 to 52 inches depending on the Theta angle. In some aspects, the boom has a length in the z-direction (Zboom) from a pivotal attachment with the spacecraft body 102 to an attachment with the thrusters 122 of at least 20 inches, at least 25 inches, at least 37 inches, or at least 52 inches. In some aspects, the boom 120 has a length (Zboom) in the z-direction of 25 to 109 inches. In some aspects, the boom 120 has a length (Zboom) in the z-direction of 25 to 65 inches, 37 to 85 inches, or 52 to 109 inches. In some aspects, a boom with adjustable length has a minimum length in the z-direction (Zboom) from a pivotal attachment with the spacecraft body 102 to an attachment with the thrusters 122 of at least 20 inches, at least 25 inches, at least 37 inches, or at least 52 inches. In some aspects, the boom's length (Zboom) in the z-direction is adjustable by at least 20 inches, at least 30 inches, at least 40 inches, or at least 50 inches. In some aspects, the boom's length (Zboom) in the z-direction is adjustable between 25 and 65 inches, between 37 and 85 inches, or between 52 and 109 inches.

Figure 11:
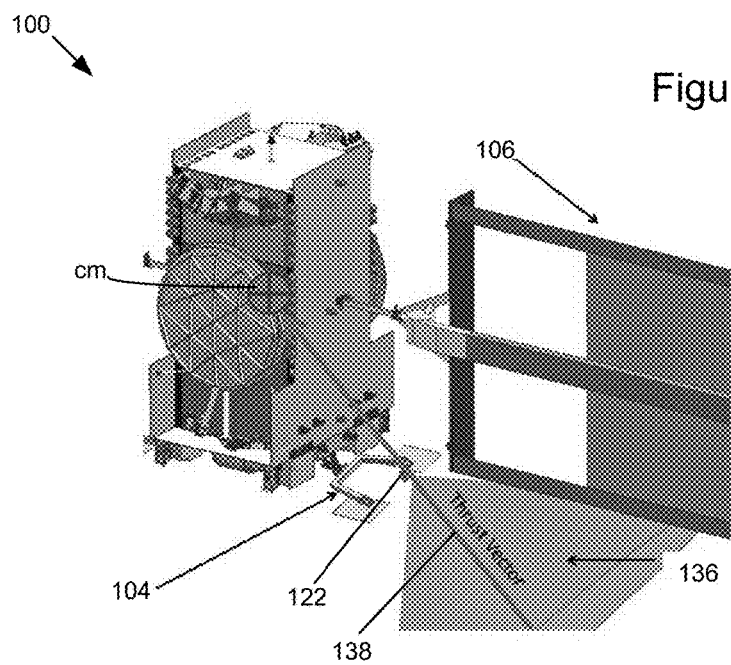
FIG. 11 is a perspective view of the spacecraft of FIGS. 1A-4, and illustrates a thruster assembly in a position for performing stationkeeping operations.
Figure 12:
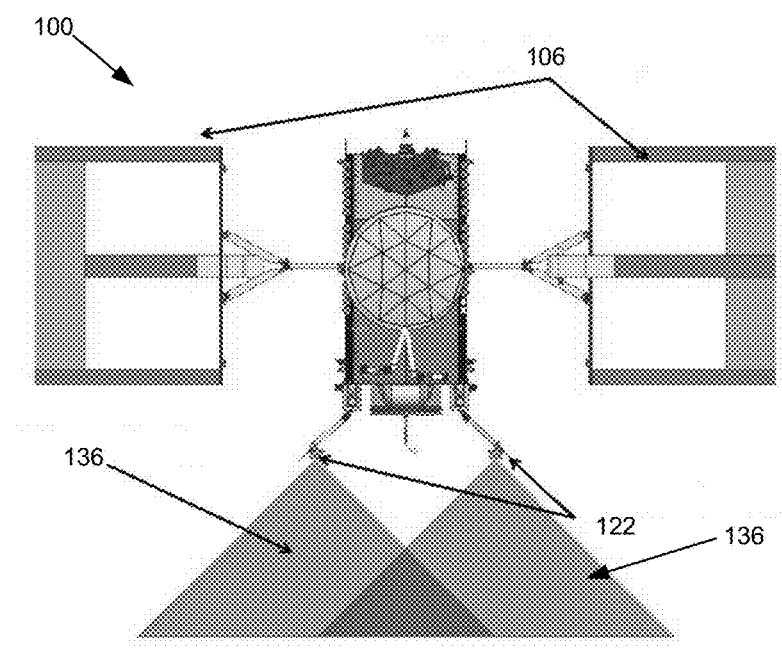
FIG. 12 is a perspective view of the spacecraft of FIGS. 1A-4, and illustrates thruster assemblies in positions for performing orbit transfer operations.

FIGS. 11 and 12 illustrate the plume benefit of some aspects of the subject technology. With the boom positioned for stationkeeping (FIG. 11), the x-axis location of the thrusters 122 is close to the separation plane 134 and the solar array 106 remains outside a 45-deg plume stay-out region 136. With the booms in the transfer orbit position (FIG. 12), the X-axis location of the thrusters 122 increases and plume effects are further reduced. FIG. 11 also shows a thrust vector 138 for one of the thrusters, which is directed through the spacecraft CM.

Other aspects variations of the subject technology will be apparent to those of ordinary skill in the art. For example, depending on the spacecraft geometry, the thruster elevation bias may be selected such that thruster stationkeeping pointing is achieved through a combination of the elevation bias and boom elevation angle. Such a partitioning can provide lower Theta angles (by translating the thrusters closer to the spacecraft CM) at the expense of increased plume effects. Also, as shown in FIGS. 13 and 14, other configurations of the thruster mounting assembly 104 are possible.

Figure 13:
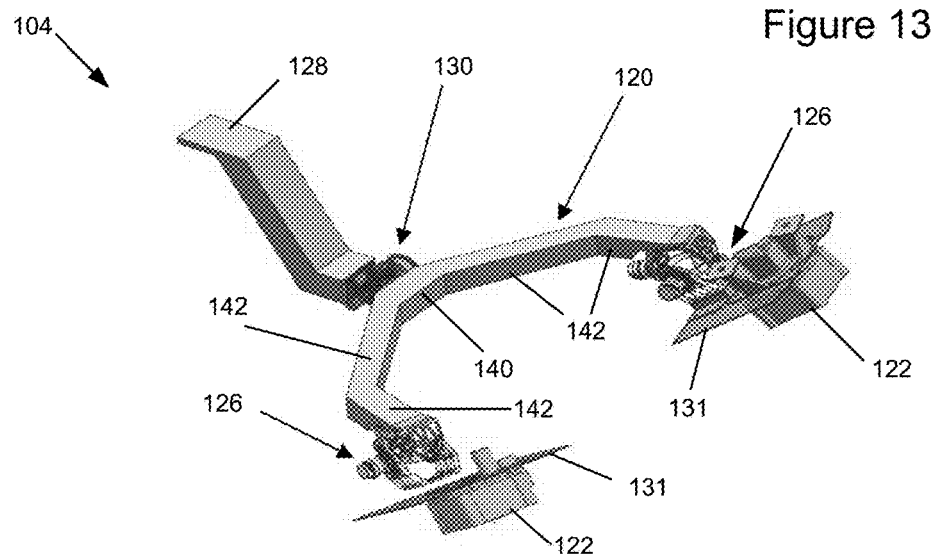
FIG. 13 illustrates a thruster arrangement comprising a boom and a plurality of thrusters.

FIG. 13 illustrates a thruster mounting assembly 104 comprising a two-axis gimbaled platform for each thruster 122. Each thruster 122 in FIG. 13 is attached to the boom 120 by a two-axis gimbal 126. The boom 120 in FIG. 13 is attached to a support structure 128 by a hinge 130. In some aspects, the boom 120 can be attached to the support structure 128 by a single- or two-axis gimbal 126.

Figure 14:
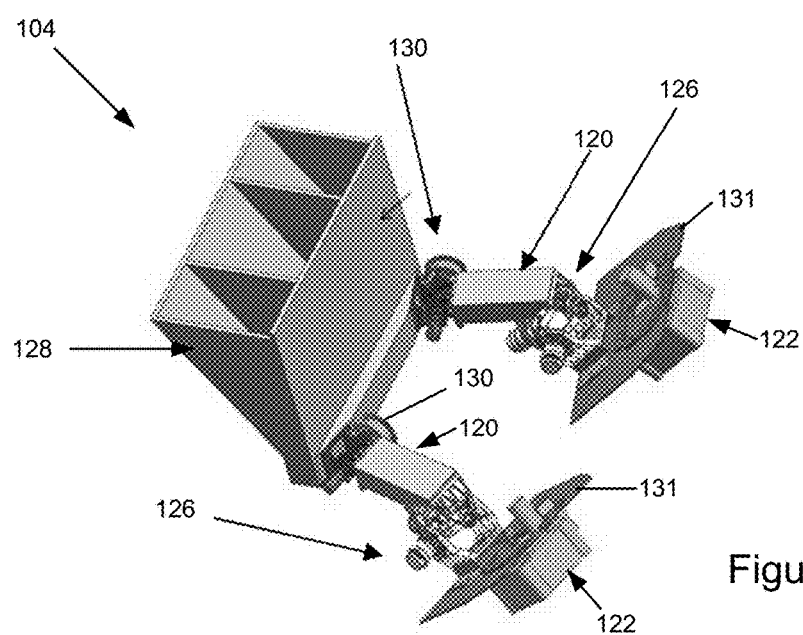
FIG. 14 illustrates a thruster arrangement comprising a plurality of booms and a plurality of thrusters.

FIG. 14 illustrates a thruster mounting assembly 104 comprising individual booms for each thruster. Each thruster 122 in FIG. 14 is attached to the corresponding boom 120 by a two-axis gimbal 126. The booms 120 in FIG. 14 are attached to a support structure 128 by a hinge 130. In some aspects, the booms 120 can be attached to the support structure 128 by gimbals in addition or alternative to a hinge 130.

Unlike an arrangement using four HCTs mounted on gimbaled booms nominally located in the spacecraft yaw/pitch plane (X/Z plane), which cannot generate in-track (y-axis) thrust and, therefore, cannot be used for East/West (E/W) stationkeeping, spacecraft according to some aspects of the subject technology do not need a separate propulsion system (e.g., a bi-propellant chemical system) for this purpose.

Acceding to some aspects of the subject technology, spacecraft have a thruster position along the x-axis that is sufficiently aft to ensure plume compatibility with deployable reflectors, such as, for example, large-aperture wire mesh reflectors that may protrude below the spacecraft base panel.

Acceding to some aspects of the subject technology, spacecraft have at least two thrusters on each of two opposing sides with the thrusters on each side separated in the y-direction by a distance sufficient to permit simultaneous firing of two thrusters on both of the opposing sides of the spacecraft for orbit transfer, e.g., two on the north side and two on the south side. In some aspects, this arrangement can potentially reduce by half the orbit transfer time compared to a system that can fire simultaneously only two thrusters.

Some aspects of the subject technology provide advantages compared to body-fixed thruster arrangements, which lack deployable booms, such as, for example, an arrangement where two HCTs are mounted adjacent to the base panel on the north and south sides of the spacecraft with thrusters separated laterally (along the y-axis). For example, some aspects of the subject technology provide the ability to change the z-axis position (distance from the spacecraft X/Y plane) of the thrusters, permitting the thrusters be positioned farther from the spacecraft X/Y plane and provide smaller Theta values with acceptable plume effects than is possible with a body fixed thruster arrangement, which has a z-axis thruster position limited by the constraints of the launch vehicle fairing and Theta values that are limited by proximity of the thrusters to the spacecraft panels, solar array, and deployable reflectors.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these aspects will be readily apparent to those skilled in the art, and generic principles defined herein may be applied to other aspects. Thus, many changes and modifications may be made to the subject technology, by one having ordinary skill in the art, without departing from the scope of the subject technology.

It is understood that the specific order or hierarchy of steps in the processes disclosed is an illustration of exemplifying approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A spacecraft, comprising:
a spacecraft body;
at least one solar array configured to move from a stored position to a deployed position away from the spacecraft body; and
a first thruster boom and a second thruster boom positioned on opposing sides of the spacecraft body, each thruster boom comprising arms connected to a lateral member between the arms at an end of the arms proximate the spacecraft body,
wherein, for at least one of the first and second thruster booms, an end of each of the arms is operably coupled to a radiator panel and a propulsion thruster at an end of the arm distal from the spacecraft body, each radiator panel being separated from each other and positioned substantially planer with the boom, each propulsion thruster being fixed relative to the respective radiator panel to provide a thrust plume offset from an axis along the respective arm, and
wherein when each of the first and second thruster booms, and the arms of the thruster booms, is positioned substantially orthogonal to one of the opposing sides of the spacecraft body, each propulsion thruster provides the thrust plume in a direction substantially along a vector passing through a center of mass of the spacecraft and away from a respective radiator panel and the at least one solar array when the at least one solar array is in the deployed position.

2. The spacecraft of claim 1, further comprising:
wherein the spacecraft body comprises a forward end, an aft end, a north side, a south side, an east side, and a west side, the spacecraft body has an x-axis, a y-axis, and a z-axis, the x-axis extending in a forward-aft direction, the y-axis extending in an east-west direction, the z-axis extending in a north-south direction, and the x-axis, the y-axis, and the z-axis being orthogonal to each other;
wherein the first thruster boom is positioned on a north side of the spacecraft body; and
wherein the second thruster boom is positioned on a south side of the spacecraft body;
wherein each of the first and second thruster booms pivots, at a hinge, between a stowed position and at least one thruster-firing position, and is rotatable about at least two nonparallel axes;
wherein, for at least one of the first and second thruster booms, a first radiator panel is disposed at first propulsion thruster, a second radiator panel is disposed at a second propulsion thruster, and the first radiator panel and the second radiator panel are spaced from each other along the y-axis.

3. The spacecraft of claim 1, wherein each propulsion thruster comprises an ion thruster.

4. The spacecraft of claim 1, wherein each propulsion thruster comprises a Hall Current Thruster.

5. The spacecraft of claim 2, wherein each thruster boom has a length, from an attachment of the thruster boom to the spacecraft body to an attachment of the thruster boom to a respective propulsion thruster of the thruster boom, of at least 20 inches as measured by a projection of the thruster boom into a plane defined by the x-axis and the z-axis.

6. The spacecraft of claim 5, wherein the length of the thruster boom is adjustable during operation of the spacecraft.

7. The spacecraft of claim 1, wherein a gimbal of each thruster boom has at least two nonparallel axes.

8. The spacecraft of claim 1, wherein at least one of the propulsion thrusters is attached to a corresponding thruster boom by a hinge.

9. The spacecraft of claim 1, wherein at least one of the propulsion thrusters is attached to a corresponding boom by a gimbal having at least two nonparallel axes.

10. The spacecraft of claim 2, wherein each of the propulsion thrusters of a corresponding thruster boom are separated by at least 20 inches.

11. The spacecraft of claim 10, wherein each of the propulsion thrusters is separated from a boom azimuth axis by at least 10 inches along the y-axis.

12. The spacecraft of claim 1, wherein at least one of the propulsion thrusters is attached to a corresponding thruster boom by an elevation bracket at the angle offset from an axis along the arm such that, when the corresponding boom is in a stationkeeping position, the thrust vector of the at least one propulsion thruster intersects a center of mass of the spacecraft.

13. The spacecraft of claim 2, wherein each thruster boom has a length, from an attachment of that thruster boom to the spacecraft body to an attachment of that thruster boom to a respective propulsion thruster of the thruster boom, of at least 20 inches as measured in a north-south direction when that thruster boom is at a position of maximum displacement in the north-south direction of the one of the thrusters from a center of mass of the spacecraft.

14. The spacecraft of claim 2, wherein each of the propulsion thrusters of a corresponding thruster boom are separated in the east-west direction by at least 20 inches.

15. The spacecraft of claim 1, wherein the end of each of the arms is located opposite the lateral member.

16. The spacecraft of claim 15, wherein each propulsion thruster is positioned to direct the plume of the respective propulsion thruster away from the at least one solar array when the thrust vector of the respective propulsion thruster is through a center of mass of the spacecraft body and when the at least one solar array is in the deployed position.

17. A method of operating a spacecraft, the method comprising:
moving a first plurality of thrusters, attached to a spacecraft body by a first boom and a first hinge, from a stowed position to a firing position, wherein the first plurality of thrusters is positioned north of a north side of the spacecraft body in the stowed position with the first plurality of thrusters pointing away from a second plurality of thrusters and the north side of the spacecraft body, wherein the firing position of the first plurality of thrusters is farther north of the north side of the spacecraft body than is the stowed position of the first plurality of thrusters,
wherein the first plurality of thrusters comprises a first thruster and a second thruster separated from each other in an east-west direction, the first boom comprising a first arm and a second arm extending from a lateral member connected between the first and second arms at an end of the arms proximate the spacecraft body and with a space between the first arm and the second arm, the first thruster and a first radiator panel attached to an end of the first arm distal from the spacecraft body, and the second thruster and a second radiator panel attached to an end of the second arm distal from the spacecraft body, the first radiator panel and the second radiator panel being spaced from each other in an east-west direction and substantially planar with the arms of the first boom;
moving the second plurality of thrusters, attached to the spacecraft body by a second boom and a second hinge, from the stowed position to the firing position, wherein the second plurality of thrusters is positioned south of a south side of the spacecraft body in the stowed position of the second plurality of thrusters with the second plurality of thrusters pointing away from the first plurality of thrusters and the north side of the spacecraft body, wherein the firing position of the second plurality of thrusters is farther south of the south side of the spacecraft body than is the stowed position of the second plurality of thrusters,
wherein the second plurality of thrusters comprises a third thruster and a fourth thruster separated from each other in the east-west direction, the second boom comprising a third arm and a fourth arm extending from a lateral member connected between the first and second arms at a first end of the arms proximate the spacecraft body and with a space between the third arm and the fourth arm, the third thruster and a third radiator panel attached to an end of the third arm distal from the spacecraft body, and the fourth thruster and a fourth radiator panel attached to an end of the fourth arm distal from the spacecraft body, the third radiator panel and the fourth radiator panel being spaced from each other in an east-west direction and substantially planar with the arms of the second boom,
wherein each thruster is fixed relative to the respective arm to provide a thrust plume offset from an axis along the respective arm and, when a corresponding boom and the respective arms of the boom are positioned substantially orthogonal to a side of the spacecraft body connected to a solar array, the thruster provides the thrust plume in a direction away from a respective radiator panel and the axis along the respective arm substantially along a vector passing through a center of mass of the spacecraft and away from the solar array when the solar array is in deployed position;
with the first plurality of thrusters and the second plurality of thrusters in their respective firing positions, firing at least some of the thrusters to generate in-track thrust; and
with the first plurality of thrusters and the second plurality of thrusters in their respective firing positions, firing at least some of the thrusters to generate cross-track thrust.

18. The method of claim 17, further comprising increasing a length of the first boom between a first attachment, of the first boom to the spacecraft body, and a second attachment, of the first boom to at least one of the first plurality of thrusters.

19. The method of claim 17, wherein the first plurality of thrusters are moved at least 20 inches from the stowed position of the first plurality of thrusters to the firing position of the first plurality of thrusters.

20. The method of claim 17, wherein moving the first plurality of thrusters from the stowed position to the firing position comprises pivoting the first boom.

21. The method of claim 20, further comprising pivoting at least one of the thrusters about at least two nonparallel axes.

22. The method of claim 17, further comprising moving the first plurality of the thrusters to, and firing at least some of the first plurality of the thrusters at, a position aft of a separation plane of the spacecraft.

23. The method of claim 22, wherein an angle $\theta$ between a thrust vector and a pitch axis is less than 51 degrees when the first plurality of the thrusters is at the position aft of the separation plane of the spacecraft.

* * * * *